[3,690,857]

METHOD OF CONTROLLING AQUATIC WEEDS, AND OTHER UNDESIRED FORMS OF AQUATIC LIFE, WITHOUT ADVERSELY AFFECTING FISH

Charles M. Blair, Jr., Fullerton, Calif., assignor to Magna Corporation, Santa Fe Springs, Calif.
No Drawing. Filed Feb. 19, 1969, Ser. No. 800,723
Int. Cl. A01n 9/24, 9/28
U.S. Cl. 71—66          4 Claims

ABSTRACT OF THE DISCLOSURE

The disclosure relates to a method of controlling a wide spectrum of life found in watery media, including aquatic plants, marine animals, algae, fungi, molds, slimes, bacteria and symbiotic growths, without adversely affecting fish populations. The method comprises adding an acrolein diacetal to a body of water containing the aquatic life to be controlled, in quantity sufficient and for a time period sufficient to kill weeds and other undesired forms of aquatic life without at the same time killing the fish present in such body. More specifically, the acrolein diacetal added is one derived from an aliphatic alcohol containing less than seven carbon atoms. A particularly preferred acrolein diacetal employed in the present method is acrolein dimethyl acetal.

BACKGROUND OF THE INVENTION

Field of the invention

The field of the invention relates to the control of aquatic life in irrigation canals, rivers, ponds, lakes, impoundments, and other places where fish reside.

Description of the prior art

The problems of controlling the growths of organisms in aqueous systems are serious and growing in severity. Submerged aquatic weeds, for example, cause major problems in water distribution and irrigation systems. The growth of weeds in irrigation canals greatly reduces the conductivity and capacity of such systems, with resulting substantial economic loss. Large sums are spent in mechanical and other methods of removal of weed growths from irrigation canals, especially in the western parts of the United States.

Because of the great difficulties involved in the mechanical removal of weeds and other undesired forms of aquatic life from irrigation canals, ponds, lakes, impoundments, etc., it has been proposed to utilize chemical control. Accordingly, various types of chemicals have been added to such bodies of water, for example as described in U.S. Pat. 2,959,476 for a Method of Controlling Aquatic Plants. Such patent discloses the use of acrolein to effect the desired chemical control. However, when acrolein and certain other chemicals employed to control aquatic life are utilized in sufficient quantity to kill weeds and/or perform other desired control functions, they are lethal to the fish naturally present. Thus, many bodies of water which contain undesirable aquatic weeds, etc., cannot be effectively treated today without complete or substantial loss of the desirable fish therein. For this reason, attempts have been made to "herd" or shift the fish to different parts of the body of water while other parts thereof were chemically treated, but such attempts have generally been unsuccessful or uneconomic.

Not only are acrolein and many other herbicides generally lethal to fish as well as plants, but they suffer from certain other important defects. Thus, for example, acrolein, chlorine, etc., are materials of high vapor pressure and are accordingly fugitive and quickly lost from the bodies of water and into the atmosphere. Also, acrolein is a lachrymator to such a degree that it may not be employed effectively in enclosed spaces or in certain other locations. Acrolein is also undesirbale relative to such factors as odor, flash point, and diluent effect.

Accordingly, there exists a very distinct need for a method of controlling the growth of aquatic organisms, including flora, marine animals and other water-dwelling organisms, yet which will not kill fish, and which involves the use of a chemical which is broadly useful, long-acting and non-damaging.

SUMMARY OF THE INVENTION

Stated generally, the present method comprises adding to a body of water containing fish, and also containing aquatic weeds or other undesired forms of aquatic life, an acrolein diacetal which is effective to control such weeds and aquatic life without at the same time adversely affecting the fish. It is preferred that the acrolein diacetal employed in the present method be one derived from an aliphatic alcohol containing less than seven carbon atoms. A particularly preferred acrolein diacetal is acrolein dimethyl acetal.

DESCRIPTION OF THE PREFERRED EMBODIMENT

The general formula for compounds effective in the present process may be represented by:

(1) 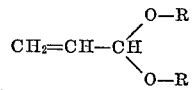

where R is a hydrocarbon group. These compounds are acrolein diacetals and may be described as the diethers of the hypothetical gem diol formed by the hydration of acrolein. In the most general aspect of the invention, the two R groups may be joined by carbon-to-carbon bonds with a consequent hypothetical loss of two hydrogen atoms, to form a difunctional hydrocarbon group, and in such cases the acrolein diacetals are cyclic ones, i.e.

1a 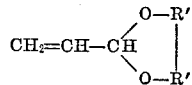

The preparation of acrolein diacetals has been well described in the chemical literature. One source of material is Acrolein, C. W. Smith, editor (John Wiley & Sons, 1962). A general method of preparation involves the reaction of acrolein with somewhat more than two equivalents of alcohol, using traces of acid as catalyst. Temperatures should be kept low, preferably under 50 degrees C., in order to minimize polymerization of acrolein or its diacetal. Water is removed by azeotropic distillation with a low boiling solvent such as petroleum ether or by stirring with silica gel or other neutral or mildly acidic dehydrating agents.

By using glycols, cyclic diacetals can readily be formed. R. F. Fisher and C. W. Smith, J. Org. Chem. 25, 319 (1960), describe such syntheses. Ethylene glycol, propylene glycol and glycerin all readily form cyclic diacetals in reasonably good yield. Epichlorohydrin also reacts readily when using stannic chloride as catalyst. In this case HCl is evolved.

Examples of diacetals useful in the present process include those derivable, at least hypothetically even when actually synthesized otherwise, from alcohols in which the OH groups is attached to alkyl, cycloalkyl, aralkyl, alkylene or other hydrocarbon group. In the broadest aspect, the alcohol may be dihydric or polyhydric and may have two or more alcoholic groups reacted with acrolein.

Specific examples of acrolein diacetals useful in practicing the present process include the following: dimethyl, diethyl, mixed methyl ethyl, ethylene glycol cyclic, hexyleneglycol cyclic, glyceryl cyclic, dibutyl, diisopropyl, dibenzyl, diterpenyl and the like. Especially useful acrolein diacetals are those derived from aliphatic alcohols, namely those in which the R group of the above-stated Formula 1 is alkyl. The aliphatic alcohols should be those containing less than seven carbon atoms, this being for reasons of economy, solubility in water, etc.

While the diacetals described above are broadly useful in the present process of inhibiting and controlling flora and micro-organisms in aquatic systems, an outstandingly effective member of the preferred class of acrolein diacetals is acrolein dimethyl acetal. Such compound has the following formula:

(2) 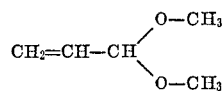

Acrolein dimethyl acetal (3,3-dimethoxypropene-1) is a mobil liquid having a mild ethereal odor. It boils at about 90 degrees C. and is slightly soluble in water. It is resistant to hydrolysis in aqueous media which are neutral or slightly alkaline, the condition of most systems to which it may be applied in the present process. In acidic systems it rapidly hydrolyzes to acrolein and methanol. Its half-life in solutions of pH 4 is about 15 minutes.

The quantity of acrolein diacetal employed in carrying out the present invention may vary over a considerable range. Generally, the concentration should not be under about one part per million parts of water and should not exceed about 20,000 p.p.m. For most applications, a range of 5 to 100 p.p.m. is optimal.

The optimum concentration for any specific control problem varies with the temperature, the species to be controlled, the time of contact, the sensitivity of the fish life and the shape of the water body to be treated. At higher water temperatures, less chemical is generally required for a given degree of control than is needed at lower temperatures.

In considering the treatment of moving streams for the purpose of destroying flora fixed therein, special account must be taken of the fact that the acrolein diacetal will pass over the area to be treated and that the time of contact and concentration during the contact period are dependent upon the water flow rate, the rate of chemical addition, and the period of addition. In such treatments it is convenient and helpful to characterize the treatment as the product of concentration of chemical and time of contact. For example, a treatment with 10 p.p.m. of acrolein dimethyl acetal in contact with weed surfaces for a period of 40 minutes could be characterized as a 400 p.p.m.-minute treatment. Within limits, one may substitute time for concentration or vice versa in many applications.

Limits on the time of contact may vary widely, as from a minute or two to continuous contact, but the preferred times are from about 20 minutes upward.

The manner of application of the chemical reagents contemplated herein may be similar to those applicable relative to acrolein, as stated in the above-cited patent. The reagents used in the present invention are less volatile and somewhat less chemically reactive than acrolein, and so may often be used in lower concentrations in systems subject to large evaporative losses.

The diacetals employed in the present method usually have somewhat limited solubility in water. Accordingly, inclusion of an emulsifier in the reagent is frequently helpful in bringing about rapid dissemination and dissolution of the concentrated reagent when it is added to water. Oil-soluble emulsifiers are especially useful. The ethylene oxide adduct of oleyl alcohol containing 10 moles of ethylene oxide per mole of oleyl alcohol is one satisfactory type of emulsifier. Use of 2 to 3% of such materials, based on the diacetal, is usually sufficient.

The present reagents may also be added in the form of hydrocarbon solutions. When used as herbicides, especially, the use of a solution in an aromatic solvent is particularly effective. Aromatic solvents of intermediate boiling range, such as xylene or aromatic kerosene or similar hydrocarbons, preferably boiling in the range of 200–400 degrees F., have significant herbicidal properties when applied in high concentrations. Used as a solvent for the acrolein diacetals, an apparently synergistic and mutually reinforcing action occurs which provides very effective herbicidal activity at low total concentrations and minimum cost. When used in this manner, it is again helpful to include emulsifiers in the hydrocarbon solution in order to speed dissemination of the solution throughout the aqueous phase.

The acrolein diacetals used in the present method are sometimes subject to self polymerization if brought into contact with catalysts under certain conditions. Oxygen, and oxygen compounds such as peroxides, are frequently found to be polymerization catalysts. In order to minimize polymerization of the present reagents during manufacture, shipment, storage and use, the addition of small amounts of a polymerization inhibitor is desirable. Thus, the reagents used in the present invention may contain about 0.3% of hydroquinone or similar inhibitor for free radical type polymerization.

The acrolein diacetals are not necessarily employed as chemically pure products. While it is preferred to employ products containing a minimum of unreacted acrolein, it is possible to use commercial materials which may contain a few percent of acrolein provided such percent is not sufficient to damage fish life. Even greater amounts of excess reactants, such as alcohol or acid anhydride, may be present without deleteriously affecting the present method.

The presence of acrolein is objectionable from the standpoint of odor, toxicity, flash point and lethal effect on fish, and also because of its effect as a diluent. Therefore, it is preferred to use commercial products which, if not entirely purified and refined, are made with sufficient excess of alcohol or anhydride to produce products containing less than 5% free acrolein, and (as above indicated) a percentage not toxic to fish. Such products may contain 10%, 20% or even more of reactant or reaction product such as methanol, ethanol, ethylene glycol, acetic anhydride, acetic acid and the like. Except for their diluent effects, these latter types of impurities appear not to interfere with the effectiveness of the diacetal contained in the mixture. The mixtures may be used as such, or in hydrocarbon or other solution, by taking into account the amount of diacetal contained therein when determining the quantity to be used in the control process.

As a first example of the present method, several growing flats of two aquatic weeds, American Elodea and Sago Pondweed, were placed in each of four laboratory circular canals containing flowing water of composition similar to that used for irrigation in the Sacramento Valley in California. In each of the experimental canals, also, were placed 10 green sunfish and 10 mosquito fish. A known concentration of commercial acrolein dimethyl acetal which contained about 95% acrolein dimethyl acetal, about 0.3% hydroquinone, and the remainder free methyl alcohol, was placed in each canal. The water was circulated for a known length of time and was then removed by displacement with fresh, untreated water. The fish and weeds were then observed for a period of ten days, and the percentage of each species killed by the treatment was noted.

The following table summarizes the results obtained:

| Concentration, p.p.m. | Duration of exposure, hrs. | Percentage kill | | | |
|---|---|---|---|---|---|
| | | American elodea | Sago pondweed | Green sunfish | Mosquito fish |
| 1 | 6 | 100 | 50 | 0 | 0 |
| 1 | 24 | 100 | 30 | 0 | 0 |
| 2 | 24 | 40 | 30 | 0 | 0 |
| 2 | 48 | 100 | 0 | 0 | 0 |
| 5 | 6 | 100 | 100 | 0 | 0 |
| 5 | 24 | 100 | 100 | 0 | 0 |

The acrolein dimethyl acetal was, as above stated, remarkable for its non-toxic effect on fish, even at the higher concentrations, while at the same time achieving 100% kills of American Elodea in almost all instances and 100% kills of Sago Pondweed at the 5 p.p.m. concentration.

As a second example, experiments similar to those described above were conducted in outdoor irrigation canals containing flats of the same aquatic weeds, and also cages of green sunfish. The results were as follows:

| Concentration, p.p.m. | Duration of exposure, hrs. | Percentage kill | | |
|---|---|---|---|---|
| | | American elodea | Sago pondweed | Green sunfish |
| 2 | 4 | 23 | 0 | 0 |
| 2 | 8 | 100 | 0 | 0 |
| 2 | 12 | 100 | 0 | 0 |
| 4 | 4 | 50 | 0 | 0 |
| 4 | 8 | 100 | 50 | 0 |
| 4 | 12 | 100 | 100 | 0 |

These results are generally confirmatory of those shown above, except that the acrolein dimethyl acetal acted as an effective herbicide at somewhat lower concentrations and with shorter contact times than were found in the laboratory tests. The lack of toxicity of the acrolein dimethyl acetal to sunfish is striking.

Throughout this specification and claims, applicant has employed the expression "acrolein diacetal" to indicate the substances effective in the present method. Other workers in the art sometimes employ the expression "acrolein acetal" to denote the same substances.

I claim:
1. In the treatment of a canal containing a moving body of water, fish and higher aquatic weeds, the step comprising:

introducing into said canal acrolein diacetal at a concentration sufficiently high and for a time period sufficiently long to kill said higher aquatic weeds, but such concentration being sufficiently low and such time period being sufficiently short to avoid killing a major percentage of said fish, where said acrolein diacetal is

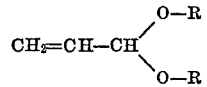

wherein R is alkyl containing less than seven carbon atoms.

2. The treatment method of claim 1 where said acrolein diacetal is acrolein dimethyl acetal.

3. The treatment method of claim 1 where said concentration of acrolein diacetal is about 1–100 parts per million parts of said body of water and said time period is at least 20 minutes.

4. The treatment method of claim 2 where said acrolein diacetal is dissolved in a liquid aromatic hydrocarbon boiling between 200° and 400° F.

References Cited

UNITED STATES PATENTS

| 2,959,476 | 11/1960 | Van Overbeek | 71—66 |
| 3,298,906 | 1/1967 | Knowles | 424—342 |

FOREIGN PATENTS

| 952,926 | 4/1964 | Great Britain | 71—67 |

OTHER REFERENCES

French Pat. No. 1,399,162, May 14, 1965. Chem. Abst., vol. 64 (1966), 1884h.

LEWIS GOTTS, Primary Examiner

C. L. MILLS, Assistant Examiner

U.S. Cl. X.R.

71—67; 424—278, 342